June 10, 1924.
D. NOBLE
LUBRICATING DEVICE
Original Filed May 6, 1918
1,496,901
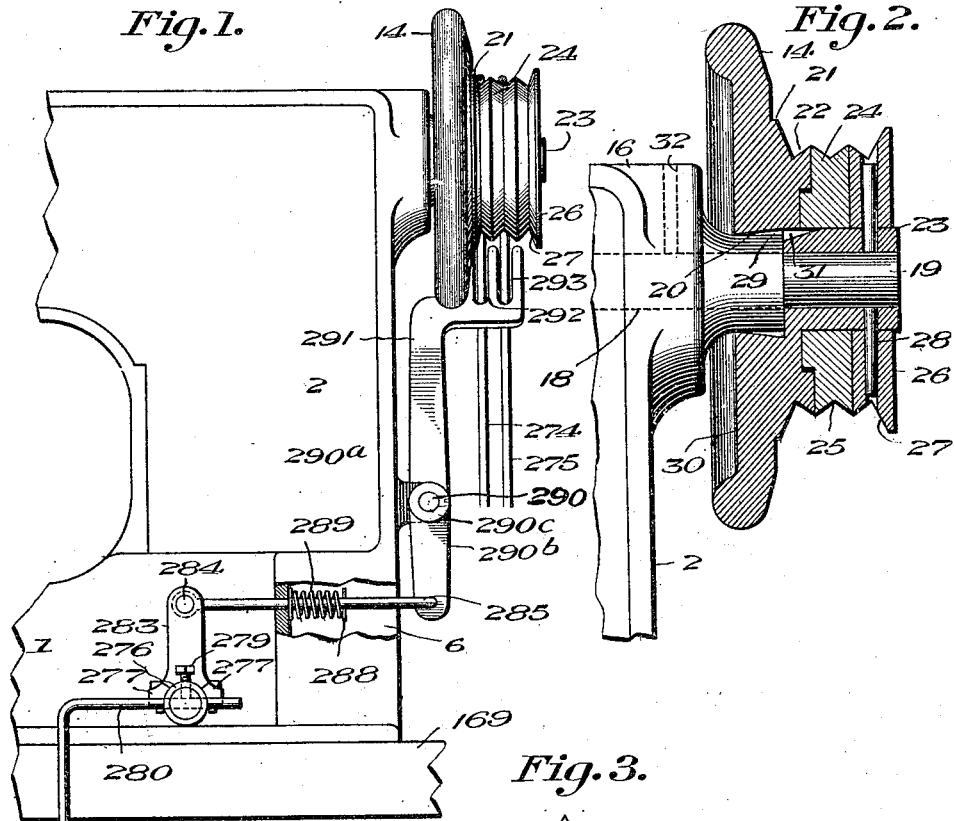
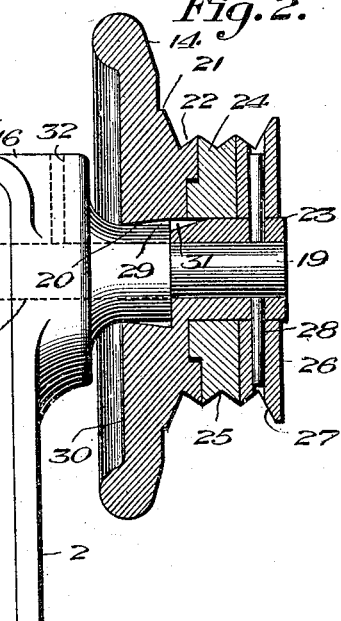
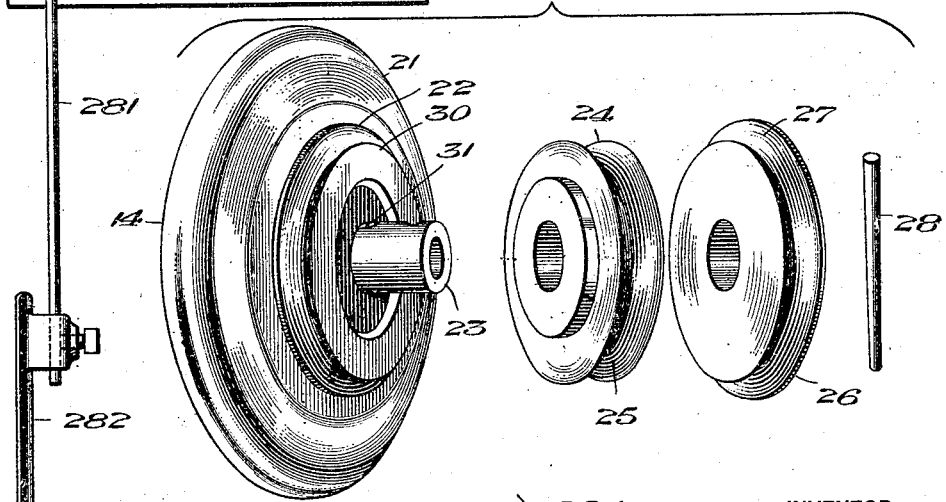
WITNESSES:
Philip E. Barnes
INVENTOR
Donald Noble
BY Henry J. Miller
ATTORNEY Patented June 10, 1924.

1,496,901

UNITED STATES PATENT OFFICE.

DONALD NOBLE, OF BRIDGEPORT, CONNECTICUT, ASSIGNOR TO THE SINGER MANUFACTURING COMPANY, A CORPORATION OF NEW JERSEY.

LUBRICATING DEVICE.

Original application filed May 6, 1918, Serial No. 232,744. Divided and this application filed February 12, 1919. Serial No. 276,608.

*To all whom it may concern:*

Be it known that I, DONALD NOBLE, a subject of the King of Great Britain, residing at Bridgeport, in the county of Fairfield and State of Connecticut, have invented certain new and useful Improvements in Lubricating Devices, of which the following is a specification, reference being had therein to the accompanying drawings.

The present invention relates to improvements in driving mechanisms, and especially to driving mechanisms for perforating machines of the type illustrated in the application of Noble, #232,744, May 6, 1918, this application being a division of the same.

The invention is designed primarily to provide means for driving the machine at two widely different speeds, said means comprising a pair of pulleys fixed upon the drive shaft, a loose pulley or idler interposed between the said fast pulleys, a pair of belts moving at different speeds adapted for engagement with the respective fast pulleys, and knee or finger operated devices for simultaneously shifting the belts.

In driving mechanisms of this character as commonly constructed and in which a series of fast and loose pulleys are employed difficulty has been experienced in properly lubricating the loose pulley, and to overcome this difficulty a novel and practical means of lubrication has been provided in the construction of the drive pulleys and the supporting element therefor.

The advantages and practicability of the invention will become readily apparent when the following description is read in connection with the accompanying drawings, certain particular features of construction and combinations of parts for which protection is desired, being assembled and pointed out in the appended claims.

In the drawings forming a part of this specification:—

Fig. 1 is a side elevation of a portion of a perforating machine employing my drive mechanism;

Fig. 2 is an enlarged view partly in section and partly in elevation;

Fig. 3 is a disassembled perspective view of the several parts; and

Fig. 4 is a view partly in section of a modified form of belt shifting controller sometimes used.

Referring to the drawings by numeral, 1 designates the base of the machine, and 2 a chambered column rising therefrom. At its upper portion the chambered column 2 is provided with a boss 16, having a journal opening 18, which forms a bearing for the drive shaft 19. The outer end of the boss 16 is reduced in diameter as at 20 for a purpose presently set forth.

21 designates a drive pulley provided with a hand wheel 14, said drive pulley being provided on its outer face with an extended hub member 23 arranged to be mounted upon the drive shaft 19. A second drive pulley 26 is arranged to be mounted upon the end of the extended hub member 23 of the drive pulley 21, and is suitably spaced from the face of said drive pulley 21. A loose pulley 24 is interposed between the drive pulleys 21 and 26, and is arranged for free rotation upon the extended hub member 23 of the drive pulley 21. The pulleys 21, 26 and 24 are provided with belt grooves 22, 27 and 25, respectively, and a cotter pin 28, passing through suitable aligned openings in the pulley 26, hub 23 and shaft 19, serves to key the drive pulleys 21 and 26 to the shaft and to retain the several parts in their proper relation.

An annular chamber 29 is provided in the face 30 of the drive pulley 21, opposite the extended hub member 23, said annular chamber increasing in diameter inwardly from the face 30 of said pulley, and being adapted to receive the reduced portion 20 of the boss 16.

An inclined passage or duct 31 leads from the inner wall of the annular chamber 29 toward the outer face of the pulley 21, and to the bearing surface of the extended hub member 23 about which the loose pulley 25 rotates.

An oil hole 32 in the boss 16 communicates with the journal opening 18 and serves to convey oil to the shaft 19.

By virtue of this construction lubricant passing down through the opening 32 into contact with the journal opening in the boss 16 will follow along said boss until it reaches the end of the same, whereupon the rotation of the shaft 19 tends to cause said lubricant to move outwardly under centrifugal action and into contact with the interior surface of chamber 29. As such chamber is of increasing diameter inwardly, centrifugal action prevents the lubricant from traveling toward the face 30 of the pulley, but urges it along the passage 31 into contact with the bearing of pulley 24, whereby said pulley is constantly and thoroughly lubricated.

Mounted for free rocking movement upon the end of a shaft which projects from the front of the machine frame, but held against longitudinal movement upon the same, is a sleeve member 276. That portion of the sleeve member 276 which is adjacent the base member 1 is provided with a pair of oppositely disposed lugs 277, said lugs being provided with adjustable stop screws adapted to bear at their lower extremities upon the upper surface of the base 1 of the machine, and serving to adjustably limit the rocking movement of the sleeve 276 about the shaft. Passing through an opening formed in the outer extremity of the sleeve 276 is a rod 280, which may be adjustably secured within said opening as by means of a set screw 279. The rod 280, as herein shown, is bent downwardly to the left of the sleeve 276, providing a depending portion 281, extending down to a point below the machine supporting bench 169 where an adjustable knee-engaging member 282 is secured thereto, said member being properly positioned for ready engagement by the knee of the operator, whereby the member 280 serves as a means for rocking the sleeve 276 about said shaft.

The sleeve 276 at its inner extremity is provided with an upstanding arm 283 having projecting inwardly near its upper end a pin 284. Pivotally connected to the pin 284 is a link member 285, said link member passing through a suitable opening in the frame into and through a chamber 6 in the base 1. 288 is a pin passing transversely through the link 285 within the chamber 6 and serving as an abutment against which one end of a compression spring 289 surrounding said link 285 bears, the opposite extremity of said spring resting against the wall of the chamber 6, the spring 289 thus normally tending to move the link member 285 and thus rock the sleeve member 276 in a clockwise direction.

Upon the right hand outer surface of the chambered column 2 is formed a bracket 290$^a$ provided with a journal opening wherein is mounted a rock shaft 290, said shaft having fast upon its forward end a rocker arm 290$^b$ extending downwardly therefrom and pivotally connected at its lower end to the extremity of link 285, the rocker arm 290$^b$ being retained upon said shaft by means of a collar 290$^c$. Fast upon the rear end of the shaft 290, is a belt shifter lever 291, said belt shifter being provided with a pair of parallel slots 292, 293, adapted for engagement with belts 274, 275, respectively, said slots being spaced at such distance apart as to maintain said belts 274, 275 in engagement with adjacent pulleys of the series of drive pulleys 21, 26, 24, previously described.

It will be seen, that by a rocking movement of the arm 283 against the action of the spring 289, the upper extremity of the belt shifter, as shown in Fig. 1, may be caused to move to the right, thereby simultaneously shifting the respective belts 274, 275 to the pulleys next adjacent and to the right of their normal position, and that upon disengagement of the member 282 by the knee of the operator the spring 289 will automatically move the belt shifter to restore the belts 274, 275 to the position shown in Fig. 1. The belts 274, 275 are designed to be driven at different speeds, as for example by passing around pulleys of different diameter upon a suitable power shaft, not shown, it being assumed that the belt 275 travels at a higher rate of speed than belt 274.

With the above described construction, in the normal operation of the machine, belt 274, which engages pulley 21, serves to drive the shaft 19 at a relatively low speed, the belt 275 merely serving to rotate the loose pulley 24. If the operator finds it desirable to increase the speed of the drive shaft 19, he may, by engaging the member 282, with his knee, cause a simultaneous shifting of belts to the right of their position in Fig. 1, thereby moving belt 275 onto fast pulley 26, and belt 274 onto loose pulley 24. The speed of the machine will be instantly increased in accordance with the ratio of speeds of the two belts 274, 275, and such high speed may continue so long as the operator continues to press against the member 282.

In certain cases it may be found desirable to dispense with the knee device 280, and to substitute therefor a finger operated device, such as shown in Fig. 4, said device comprising a sleeve portion 294, having extending therefrom a rod 295, provided with a bent extremity 296. In the employment of this device the collar 290$^c$ is removed from shaft 290, and the sleeve 294 is secured upon the end of the shaft as by means of a set screw 297, sleeve 294 being so positioned that rod 295 extends transversely across the front of the chambered column 2 in a plane slightly inclined to the horizontal, with the bent portion lying against the left hand surface of said column and just above the base member 1. It is obvious that by a slight lifting movement of the end 296 of the rod 295, the rock shaft 290 together with the belt shifter 291, may be moved, as above indicated, to shift the belts 274, 275 to the right. While in the ordinary use of the device the knee operated part 280 would be removed when employing the finger member 295, it is clear from the construction described that both of these elements may be used if desired.

What I claim is,—

1. In a drive mechanism, in combination, a drive shaft, a sleeve constituting a bearing therefor, a drive pulley fast to said shaft and provided with a hub projecting from one face thereof, said pulley being counterbored at its opposite face to provide a chamber of inwardly increasing diameter for the reception of the end of said sleeve, a loose pulley journaled upon said hub to turn freely thereon, said fast pulley being provided with a channel for conveying lubricant from the inner peripheral wall of said chamber to the journal of the loose pulley, and a third pulley fast upon the shaft and adjacent said loose pulley.

2. In a machine of the class described, a drive shaft, a bearing member therefor, a pair of spaced apart drive pulleys fixed upon said shaft, a loose pulley journaled intermediate said fixed pulleys, an oil hole in said bearing member for conducting oil to the shaft, and a channel in one of said fixed pulleys for conveying oil along the same to the journal bearing of said loose pulley.

3. In a machine of the class described, in combination, a drive shaft, a bearing sleeve therefor, and a pulley fixed upon said shaft, said pulley being counterbored to form a chamber whose diameter increases inwardly from one face thereof and arranged for the reception of the end of said sleeve, said pulley being further provided with a channel for lubricant leading from the inner end of said chamber to the opposite face of the pulley.

4. In a drive mechanism a drive shaft, a bearing therefor, a pulley fast to the shaft, a loose pulley provided with a journal opening and arranged to turn freely about the shaft and adjacent the fast pulley, said bearing having a channel therein for conveying lubricant to the shaft, and means whereby lubricant from the shaft bearing is caused to travel by centrifugal action into the journal opening in said loose pulley.

5. In a drive mechanism, a drive-shaft, a bearing therefor, a pulley fast to the shaft and formed with a bearing hub extending therefrom oppositely from said bearing, a loose pulley provided with a journal fitted upon said bearing hub of the fast pulley, said shaft bearing having a channel therein for conveying lubricant to said shaft, and means whereby lubricant from said shaft bearing is caused to travel along said shaft and through the bearing hub of the fast pulley into said journal opening of the loose pulley.

In testimony whereof, I have signed my name to this specification.

DONALD NOBLE.